(12) United States Patent
Huang et al.

(10) Patent No.: US 12,452,784 B2
(45) Date of Patent: Oct. 21, 2025

(54) LINK REACHABILITY DETERMINING METHOD AND APPARATUS

(71) Applicant: HUAWEI TECHNOLOGIES CO., LTD., Shenzhen (CN)

(72) Inventors: Guogang Huang, Shenzhen (CN); Ming Gan, Shenzhen (CN); Yunbo Li, Shenzhen (CN); Yuchen Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 424 days.

(21) Appl. No.: 18/066,492

(22) Filed: Dec. 15, 2022

(65) Prior Publication Data

US 2023/0113050 A1  Apr. 13, 2023

Related U.S. Application Data

(63) Continuation of application No. PCT/CN2021/100723, filed on Jun. 17, 2021.

(30) Foreign Application Priority Data

Jun. 18, 2020 (CN) .......... 202010561038.1
Jul. 28, 2020 (CN) .......... 202010739697.X

(51) Int. Cl.
*H04W 48/20* (2009.01)
*H04W 76/15* (2018.01)
*H04W 88/10* (2009.01)

(52) U.S. Cl.
CPC ........ *H04W 48/20* (2013.01); *H04W 76/15* (2018.02); *H04W 88/10* (2013.01)

(58) Field of Classification Search
None
See application file for complete search history.

(56) References Cited

U.S. PATENT DOCUMENTS

| 10,499,343 | B2 * | 12/2019 | Lou .................. H04W 52/242 |
| 2014/0119279 | A1 * | 5/2014 | Han .................. H04W 48/16 370/328 |
| 2020/0221545 | A1 * | 7/2020 | Stacey .................. H04W 84/12 |

FOREIGN PATENT DOCUMENTS

| CN | 107926041 A | 4/2018 |
| WO | 2019030779 A1 | 2/2019 |

OTHER PUBLICATIONS

Abhishek et. al:, "MLO: Reachability Problem.", IEEE 802.11-20/0508r0, Mar. 2020, 8 pages.

* cited by examiner

*Primary Examiner* — Hong S Cho
(74) *Attorney, Agent, or Firm* — Maier & Maier, PLLC

(57) ABSTRACT

A link reachability determining method to enable a multi-link device to determine whether a link is reachable in an uplink direction, includes: a multi-link STA receives a first frame sent by a multi-link AP on a first link, where the first frame includes transmit power and antenna gain information of each AP of the multi-link AP; and then, the multi-link STA determines, based on the first frame, whether each of M links supported by the multi-link STA is reachable in an uplink direction.

20 Claims, 5 Drawing Sheets

LINK REACHABILITY DETERMINING METHOD AND APPARATUS

CROSS-REFERENCE TO RELATED APPLICATIONS

This application is a continuation of International Application No. PCT/CN2021/100723, filed on Jun. 17, 2021, which claims priorities to Chinese Patent Application No. 202010561038.1, filed on Jun. 18, 2020 and Chinese Patent Application No. 202010739697.X, filed on Jul. 28, 2020. All of the aforementioned patent applications are hereby incorporated by reference in their entireties.

TECHNICAL FIELD

The embodiments relate to the field of communication technologies, a link reachability determining method, and an apparatus.

BACKGROUND

A multi-link device (MLD) is capable of sending data and receiving data on a plurality of links. Multi-link devices include a multi-link access point (AP) and a multi-link station (STA). Currently, a multi-link AP and a multi-link STA may communicate with each other on a plurality of links.

If a multi-link AP receives, on a link, data sent by a multi-link STA on the link, it may be considered that the link is reachable in an uplink direction. Correspondingly, if a multi-link AP cannot receive, on a link, data sent by a multi-link STA on the link, it may be considered that the link is unreachable in an uplink direction.

However, a solution in which a multi-link device determines whether a link is reachable in an uplink direction is not provided in conventional technologies. Therefore, a multi-link STA may send uplink data on an unreachable link in an uplink direction. This affects normal communication between a multi-link STA and a multi-link AP.

SUMMARY

The embodiments may provide a link reachability determining method and apparatus, so that a multi-link device can determine whether a link is reachable in an uplink direction.

According to a first aspect, a link reachability determining method is provided. The method is applied to a multi-link station STA, the multi-link STA includes M STAs, the M STAs one-to-one correspond to M links supported by the multi-link STA, and M is an integer greater than 1. The method includes: receiving a first frame sent by a multi-link access point AP on a first link, where the first link is one of the M links supported by the multi-link STA, the multi-link AP includes N APs, the first frame includes transmit power and antenna gain information of each of the N APs, and N is an integer greater than 1; and determining, based on the first frame, whether each of the M links supported by the multi-link STA is reachable in an uplink direction.

The multi-link AP may send the first frame on the first link and the first frame may include the antenna gain information and the transmit power of each AP of the multi-link AP. In this case, after receiving the first frame on the first link, the multi-link STA can obtain a related parameter on an AP side for analyzing uplink reachability of a link based on the first frame. In this way, the multi-link STA can determine whether the link is reachable in the uplink direction. In addition, the multi-link STA may determine, based on the first frame transmitted on the first link, uplink reachability of each link supported by the multi-link STA. Therefore, in an AP discovery process, the multi-link STA needs to scan only the first link instead of all links. This helps reduce power consumption of the multi-link STA.

Determining, based on the first frame, whether each of the M links supported by the multi-link STA is reachable in an uplink direction may include: determining a link loss of a target link and antenna gain information of a target AP based on the first frame, where the target link is one of a plurality of links supported by the multi-link STA, and the target AP is an AP that is of the multi-link AP and that operates on the target link; determining uplink receive power of the target link based on the antenna gain information of the target AP, the link loss of the target link, and transmit power and antenna gain information of a target STA, where the target STA is a STA that is of the multi-link STA and that operates on the target link; and determining, based on the uplink receive power of the target link, whether the target link is reachable in the uplink direction.

When the target link is the first link, determining a link loss of a target link based on the first frame may include: obtaining transmit power and antenna gain information of a first AP based on the first frame, where the first AP is an AP that is of the multi-link AP and that operates on the first link; and determining a link loss of the first link based on downlink receive power and antenna gain information of a first STA and the transmit power and the antenna gain information of the first AP, where the first STA is a STA that is of the multi-link STA and that operates on the first link.

When the target link is a second link, determining a link loss of a target link based on the first frame may include: obtaining transmit power and antenna gain information of a first AP based on the first frame, where the first AP is an AP that is of the multi-link AP and that operates on the first link; determining a link loss of the first link based on receive power and antenna gain information of a first STA and the transmit power and the antenna gain information of the first AP, where the first STA is a STA that is of the multi-link STA and that operates on the first link; and determining a link loss of the second link based on the link loss of the first link and a preset correspondence, where the second link is a link of the M links supported by the multi-link STA other than the first link.

Determining whether the target link is reachable in the uplink direction based on the uplink receive power of the target link may include: when the uplink receive power of the target link is greater than or equal to a first threshold corresponding to the target link, determining that the target link is reachable in the uplink direction; or when the uplink receive power of the target link is less than the first threshold corresponding to the target link, determining that the target link is unreachable in the uplink direction.

The first frame may be a beacon frame or a probe response frame.

When the target link is a reachable link, the method may further include: sending an association request frame to the multi-link AP. The association request frame is for requesting to establish an association between the target STA and the target AP.

When the target link is an unreachable link, the method may further include: sending an association request frame to the multi-link AP. The association request frame is for requesting to establish an association between the target STA and the target AP, and the association request frame further indicates to disable the target link.

According to a second aspect, a link reachability determining method is provided. The method is applied to a multi-link AP, the multi-link AP includes N APs, the N APs one-to-one correspond to N links supported by the multi-link AP, and N is an integer greater than 1. The method includes: generating a first frame, where the first frame includes transmit power and antenna gain information of each of the N APs; and sending the first frame on a first link, where the first link is one of the N links supported by the multi-link AP.

The first frame may be a beacon frame or a probe response frame.

The method may further include: receiving an association request frame sent by a multi-link STA. The multi-link STA includes M STAs, the M STAs one-to-one correspond to M links supported by the multi-link STA, and M is an integer greater than 1. The association request frame is for requesting to establish an association between a target STA and a target AP, the target STA is a STA that is of the multi-link STA and that operates on a target link, the target AP is an AP that is of the multi-link AP and that operates on the target link, and the target link is a reachable link of the M links supported by the multi-link STA.

The method may further include: receiving an association request frame sent by a multi-link STA. The multi-link STA includes M STAs, the M STAs one-to-one correspond to M links supported by the multi-link STA, and M is an integer greater than 1. The association request frame is for requesting to establish an association between a target STA and a target AP, and the association request frame further indicates to disable a target link. The target STA is a STA that is of the multi-link STA and that operates on the target link, the target AP is an AP that is of the multi-link AP and that operates on the target link, and the target link is a reachable link of the M links supported by the multi-link STA.

According to a third aspect, a link reachability determining method is provided. The method is applied to a multi-link AP, the multi-link AP includes N APs, the N APs one-to-one correspond to N links supported by the multi-link AP, and N is an integer greater than 1. The method includes: receiving a second frame sent by a multi-link STA on a first link, where the first link is one of the N links supported by the multi-link AP, the multi-link STA includes M STAs, the second frame includes first information of each of P STAs, first information of a STA is for determining a sum of transmit power and an antenna gain of the STA, the P STAs are a subset of the M STAs, M is an integer greater than 1, and P is a positive integer less than or equal to M; and determining, based on the second frame, whether each of P links is reachable in an uplink direction, where the P links one-to-one correspond to the P STAs.

The second frame sent by the multi-link STA on the first link may include the first information of each of the P STAs. In this case, the multi-link AP may obtain, based on the second frame, a related parameter on a STA side for analyzing uplink reachability of any one of the P links. In this way, the multi-link AP may determine whether any one of the P links is reachable in the uplink direction.

Determining, based on the second frame, whether each of P links is reachable in an uplink direction may include: determining a link loss of a target link and first information of a target STA based on the second frame, where the target link is one of the P links, and the target STA is a STA that is of the multi-link STA and that operates on the target link; determining uplink receive power of the target link based on the first information of the target STA, the link loss of the target link, and transmit power and antenna gain information of the target AP; and determining, based on the uplink receive power of the target link, whether the target link is reachable in the uplink direction.

When the target link is the first link, determining a link loss of a target link based on the second frame may include: obtaining first information of a first STA based on the second frame, where the first STA is a STA that is of the multi-link STA and that operates on the first link; and determining a link loss of the first link based on the first information of the first STA and uplink receive power and antenna gain information of a first AP, where the first AP is an AP that is of the multi-link AP and that operates on the first link.

When the target link is a second link, determining a link loss of a target link based on the second frame may include: obtaining first information of a first STA based on the second frame, where the first STA is a STA that is of the multi-link STA and that operates on the first link; determining a link loss of the first link based on the first information of the first STA and uplink receive power and antenna gain information of a first AP, where the first AP is an AP that is of the multi-link AP and that operates on the first link; and determining a link loss of the second link based on the link loss of the first link and a preset correspondence, where the second link is a link of the P links other than the first link.

Determining, based on the uplink receive power of the target link, whether the target link is reachable in the uplink direction may include: when the uplink receive power of the target link is greater than or equal to a third threshold corresponding to the target link, determining that the target link is reachable in the uplink direction; or when the uplink receive power of the target link is less than a third threshold corresponding to the target link, determining that the target link is unreachable in the uplink direction.

The second frame may be an association request frame.

When the target link is reachable in the uplink direction, the method may further include: sending an association response frame to the multi-link STA. The association response frame is for agreeing to establish an association between the target AP and the target STA.

When the target link is unreachable in the uplink direction, the method may further include: sending an association response frame to the multi-link STA. The association response frame is for agreeing to establish an association between the target AP and the target STA, and the association response frame further indicates to disable the target link.

According to a fourth aspect, a link reachability determining method is provided. The method is applied to a multi-link STA, the multi-link STA includes M STAs, the M STAs one-to-one correspond to M links supported by the multi-link STA, and M is an integer greater than 1. The method includes: generating a second frame, where the second frame includes first information of each of P STAs, first information of a STA is for determining a sum of transmit power and an antenna gain of the STA, the P STAs are a subset of the M STAs, and P is a positive integer less than or equal to M; and sending the second frame to a multi-link AP on a first link, where the first link is one of P links.

The second frame may be an association request frame.

The method may further include: receiving an association response frame sent by the multi-link AP. The association response frame is for agreeing to establish an association between a target STA and a target AP, the target STA is a STA that is of the multi-link STA and that operates on the target link, the target AP is an AP that is of the multi-link AP and that operates on the target link, the target link is one of the P links, and the target link is reachable in at least an uplink direction.

The method may further include: receiving an association response frame sent by the multi-link AP. The association response frame is for agreeing to establish an association between a target STA and a target AP, the association response frame further indicates to disable a target link, the target STA is a STA that is of the multi-link STA and that operates on the target link, the target AP is an AP that is of the multi-link AP and that operates on the target link, the target link is one of the P links, and the target link is unreachable in an uplink direction.

According to a fifth aspect, a link reachability determining method is provided. The method is applied to a multi-link STA, and the method includes: receiving a third frame sent by a multi-link AP on a target link, where the target link is one of a plurality of links supported by the multi-link STA, the third frame includes transmit power of a target AP, and the target AP is an AP that is of the multi-link AP and that operates on the target link; and determining, based on the third frame, whether the target link is reachable in an uplink direction.

The multi-link AP may send the third frame to the multi-link STA. Because the third frame includes the transmit power of the target AP, the multi-link STA may determine, based on the third frame, whether the target link is reachable in the uplink direction. This can avoid selecting a link unreachable in an uplink direction for communication between the multi-link STA and the multi-link AP.

Determining, based on the third frame, whether the target link is reachable in an uplink direction may include: determining the transmit power of the target AP based on the third frame; determining uplink receive power of the target link based on the transmit power of the target AP, receive power of the target STA, and transmit power of the target STA, where the target STA is a STA that is of the multi-link STA and that operates on the target link; and determining, based on the uplink receive power of the target link, whether the target link is reachable in the uplink direction.

Determining, based on the uplink receive power of the target link, whether the target link is reachable in the uplink direction may include: when the uplink receive power of the target link is greater than or equal to a first threshold corresponding to the target link, determining that the target link is reachable in the uplink direction; or when the uplink receive power of the target link is less than the first threshold corresponding to the target link, determining that the target link is unreachable in the uplink direction.

According to a sixth aspect, a link reachability determining method is provided. The method is applied to a multi-link AP, and the method includes: generating a third frame, where the third frame includes transmit power of a target AP, the target AP is an AP that is of the multi-link AP and that operates on a target link, and the transmit power of the target AP is for evaluating whether the target link is reachable in an uplink direction; and sending the third frame to a multi-link STA on the target link.

According to a seventh aspect, a communication apparatus is provided. The communication apparatus is used in a multi-link STA, the multi-link STA includes M STAs, the M STAs one-to-one correspond to M links supported by the multi-link STA, and M is an integer greater than 1. The communication apparatus includes a communication module and a processing module. The communication module is configured to receive a first frame sent by a multi-link access point AP on a first link, where the first link is one of the M links supported by the multi-link STA, the multi-link AP includes N APs, the first frame includes transmit power and antenna gain information of each of the N APs, and N is an integer greater than 1. The processing module is configured to determine, based on the first frame, whether each of the M links supported by the multi-link STA is reachable in an uplink direction.

The processing module may be configured to determine, based on the first frame, whether each of the M links supported by the multi-link STA is reachable in an uplink direction includes: determining a link loss of a target link and antenna gain information of a target AP based on the first frame, where the target link is one of a plurality of links supported by the multi-link STA, and the target AP is an AP that is of the multi-link AP and that operates on the target link; determining uplink receive power of the target link based on the antenna gain information of the target AP, the link loss of the target link, and transmit power and antenna gain information of a target STA, where the target STA is a STA that is of the multi-link STA and that operates on the target link; and determining, based on the uplink receive power of the target link, whether the target link is reachable in the uplink direction.

The processing module may be configured to determine a link loss of a target link based on the first frame includes: when the target link is the first link, obtaining transmit power and antenna gain information of a first AP based on the first frame, where the first AP is an AP that is of the multi-link AP and that operates on the first link; and determining a link loss of the first link based on downlink receive power and antenna gain information of a first STA and the transmit power and the antenna gain information of the first AP, where the first STA is a STA that is of the multi-link STA and that operates on the first link.

The processing module may be configured to determine a link loss of a target link based on the first frame includes: when the target link is a second link, obtaining transmit power and antenna gain information of a first AP based on the first frame, where the first AP is an AP that is of the multi-link AP and that operates on the first link; determining a link loss of the first link based on receive power and antenna gain information of a first STA and the transmit power and the antenna gain information of the first AP, where the first STA is a STA that is of the multi-link STA and that operates on the first link; and determining a link loss of the second link based on the link loss of the first link and a preset correspondence, where the second link is a link of the M links supported by the multi-link STA other than the first link.

The processing module may be configured to determine, based on the uplink receive power of the target link, whether the target link is reachable in the uplink direction includes: when the uplink receive power of the target link is greater than or equal to a first threshold corresponding to the target link, determining that the target link is reachable in the uplink direction; or when the uplink receive power of the target link is less than the first threshold corresponding to the target link, determining that the target link is unreachable in the uplink direction.

The first frame may be a beacon frame or a probe response frame.

The communication module may be further configured to send an association request frame to the multi-link AP when the target link is a reachable link. The association request frame is for requesting to establish an association between the target STA and the target AP.

The communication module may be further configured to send an association request frame to the multi-link AP when the target link is an unreachable link. The association request frame is for requesting to establish an association between the target STA and the target AP, and the association request frame further indicates to disable the target link.

According to an eighth aspect, a communication apparatus is provided. The communication apparatus is used in a multi-link AP, the multi-link AP includes N APs, the N APs one-to-one correspond to N links supported by the multi-link AP, and N is an integer greater than 1. The communication apparatus includes a processing module and a communication module. The processing module is configured to generate a first frame corresponding to a first link. The first link is one of the N links supported by the multi-link AP, and the first frame includes transmit power and antenna gain information of each of the N APs. The communication module is configured to send the first frame on the first link.

The first frame may be a beacon frame or a probe response frame.

The communication module may be further configured to receive an association request frame sent by a multi-link STA. The multi-link STA includes M STAs, the M STAs one-to-one correspond to M links supported by the multi-link STA, and M is an integer greater than 1. The association request frame is for requesting to establish an association between a target STA and a target AP, the target STA is a STA that is of the multi-link STA and that operates on a target link, the target AP is an AP that is of the multi-link AP and that operates on the target link, and the target link is a reachable link of the M links supported by the multi-link STA.

The communication module may be further configured to receive an association request frame sent by a multi-link STA. The multi-link STA includes M STAs, the M STAs one-to-one correspond to M links supported by the multi-link STA, and M is an integer greater than 1. The association request frame is for requesting to establish an association between a target STA and a target AP, and the association request frame further indicates to disable a target link. The target STA is a STA that is of the multi-link STA and that operates on the target link, the target AP is an AP that is of the multi-link AP and that operates on the target link, and the target link is a reachable link of the M links supported by the multi-link STA.

According to a ninth aspect, a communication apparatus is provided. The communication apparatus is used in a multi-link AP, the multi-link AP includes N APs, the N APs one-to-one correspond to N links supported by the multi-link AP, and N is an integer greater than 1. The communication apparatus includes a processing module and a communication module. The communication module is configured to receive a second frame sent by a multi-link STA on a first link, where the first link is one of the N links supported by the multi-link AP, the multi-link STA includes M STAs, the second frame includes first information of each of P STAs, first information of a STA is for determining a sum of transmit power and an antenna gain of the STA, the P STAs are a subset of the M STAs, M is an integer greater than 1, and P is a positive integer less than or equal to M. The processing module is configured to determine, based on the second frame, whether each of P links is reachable in an uplink direction, where the P links one-to-one correspond to the P STAs.

The processing module may be configured to determine, based on the second frame, whether each of P links is reachable in an uplink direction includes: determining a link loss of a target link and first information of a target STA based on the second frame, where the target link is one of the P links, and the target STA is a STA that is of the multi-link STA and that operates on the target link; determining uplink receive power of the target link based on the first information of the target STA, the link loss of the target link, and transmit power and antenna gain information of the target AP; and determining, based on the uplink receive power of the target link, whether the target link is reachable in the uplink direction.

The processing module may be configured to determine a link loss of a target link based on the second frame includes: when the target link is the first link, obtaining first information of a first STA based on the second frame, where the first STA is a STA that is of the multi-link STA and that operates on the first link; and determining a link loss of the first link based on the first information of the first STA and uplink receive power and antenna gain information of a first AP, where the first AP is an AP that is of the multi-link AP and that operates on the first link.

The processing module may be configured to determine a link loss of a target link based on the second frame includes: when the target link is a second link, obtaining first information of a first STA based on the second frame, where the first STA is a STA that is of the multi-link STA and that operates on the first link; determining a link loss of the first link based on the first information of the first STA and uplink receive power and antenna gain information of a first AP, where the first AP is an AP that is of the multi-link AP and that operates on the first link; and determining a link loss of the second link based on the link loss of the first link and a preset correspondence, where the second link is a link of the P links other than the first link.

The processing module may be configured to determine, based on the uplink receive power of the target link, whether the target link is reachable in an uplink direction includes: when the uplink receive power of the target link is greater than or equal to a third threshold corresponding to the target link, determining that the target link is reachable in the uplink direction; or when the uplink receive power of the target link is less than a third threshold corresponding to the target link, determining that the target link is unreachable in the uplink direction.

The second frame may be an association request frame.

The communication module may be further configured to send an association response frame to the multi-link STA when the target link is reachable in the uplink direction. The association response frame is for agreeing to establish an association between the target AP and the target STA.

The communication module may be further configured to send an association response frame to the multi-link STA when the target link is unreachable in the uplink direction. The association response frame is for agreeing to establish an association between the target AP and the target STA, and the association response frame further indicates to disable the target link.

According to a tenth aspect, a communication apparatus is provided. The communication apparatus is used in a multi-link STA, the multi-link STA includes M STAs, the M STAs one-to-one correspond to M links supported by the multi-link STA, and M is an integer greater than 1. The communication apparatus includes a processing module and a communication module. The processing module is configured to generate a second frame. The second frame includes first information of each of P STAs, first information of a STA is for determining a sum of transmit power and an antenna gain of the STA, the P STAs are a subset of the M STAs, and P is a positive integer less than or equal to M. The communication module is configured to send the second frame to a multi-link AP on a first link, where the first link is one of P links.

The second frame may be an association request frame.

The communication module may be further configured to receive an association response frame sent by the multi-link AP. The association response frame is for agreeing to establish an association between a target STA and a target AP, the target STA is a STA that is of the multi-link STA and that operates on the target link, the target AP is an AP that is of the multi-link AP and that operates on the target link, the target link is one of the P links, and the target link is reachable in at least an uplink direction.

The communication module may be further configured to receive an association response frame sent by the multi-link AP. The association response frame is for agreeing to establish an association between a target STA and a target AP, the association response frame further indicates to disable a target link, the target STA is a STA that is of the multi-link STA and that operates on the target link, the target AP is an AP that is of the multi-link AP and that operates on the target link, the target link is one of the P links, and the target link is unreachable in an uplink direction.

According to an eleventh aspect, a communication apparatus is provided. The communication apparatus is used in a multi-link STA. The communication apparatus includes a communication module and a processing module. The communication module is configured to receive a third frame sent by a multi-link AP on a target link. The target link is one of a plurality of links supported by the multi-link STA, the third frame includes transmit power of a target AP, and the target AP is an AP that is of the multi-link AP and that operates on the target link. The processing module is configured to determine, based on the third frame, whether the target link is reachable in an uplink direction.

The processing module may be configured to: determine the transmit power of the target AP based on the third frame; determine uplink receive power of the target link based on the transmit power of the target AP, receive power of the target STA, and transmit power of the target STA, where the target STA is a STA that is of the multi-link STA and that operates on the target link; and determine, based on the uplink receive power of the target link, whether the target link is reachable in the uplink direction.

The processing module may be configured to: when the uplink receive power of the target link is greater than or equal to a first threshold corresponding to the target link, determine that the target link is reachable in the uplink direction; or when the uplink receive power of the target link is less than the first threshold corresponding to the target link, determine that the target link is unreachable in the uplink direction.

According to a twelfth aspect, a communication apparatus is provided. The communication apparatus is used in a multi-link AP. The communication apparatus includes a processing module and a communication module. The processing module is configured to generate a third frame. The third frame includes transmit power of a target AP, the target AP is an AP that is of the multi-link AP and that operates on a target link, and the transmit power of the target AP is for evaluating whether the target link is reachable in an uplink direction. The communication module is configured to send the third frame to a multi-link STA on the target link.

According to a thirteenth aspect, a communication apparatus is provided. The communication apparatus includes a processor and a communication interface. The processor and the communication interface are configured to implement any method provided in any one of the first aspect to the sixth aspect. The processor is configured to perform a processing action in a corresponding method, and the communication interface is configured to perform a receiving/sending action in a corresponding method.

According to a fourteenth aspect, a non-transitory computer-readable storage medium is provided. The non-transitory computer-readable storage medium stores computer instructions. When the computer instructions are run on a computer, the computer is enabled to perform any method provided in any one of the first aspect to the sixth aspect.

According to a fifteenth aspect, a computer program product including computer instructions is provided. When the computer instructions are run on a computer, the computer is enabled to perform any method provided in any one of the first aspect to the sixth aspect.

According to a sixteenth aspect, a chip is provided. The chip includes a processing circuit and a transceiver pin. The processing circuit and the transceiver pin are configured to implement any method provided in any one of the first aspect to the sixth aspect. The processing circuit is configured to perform a processing action in a corresponding method, and the transceiver pin is configured to perform a receiving/sending action in a corresponding method.

According to a seventeenth aspect, a communication system is provided, including a multi-link AP and a multi-link STA. The multi-link STA is configured to perform the method in the first aspect or the fourth aspect. The multi-link AP is configured to perform the method in the second aspect or the third aspect.

It should be noted that, for the seventh aspect to the seventeenth aspect, refer to the first aspect to the sixth aspect. Details are not described herein again.

DETAILED DESCRIPTION OF THE EMBODIMENTS

Figure 1:
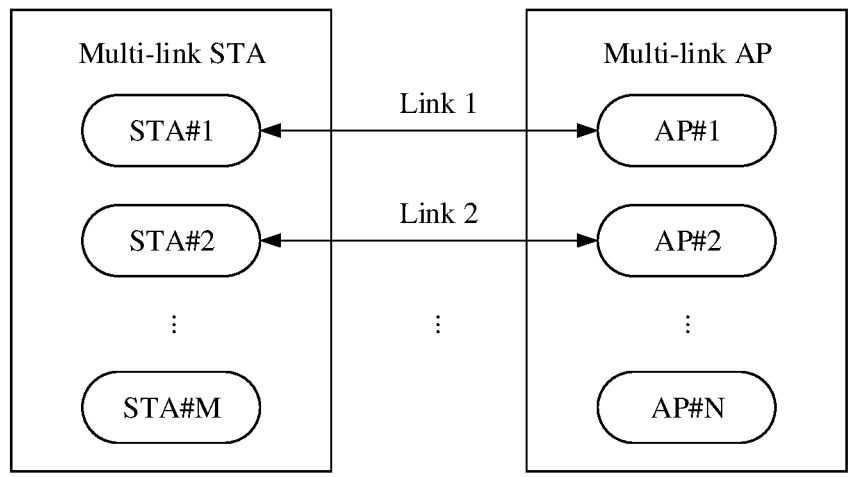
FIG. 1 is a schematic diagram of a communication system according to an embodiment.

The following describes the embodiments with reference to the accompanying drawings.

In the descriptions, unless otherwise specified, "l" means "or". For example, A/B may represent A or B. The term "and/or" describes only an association relationship for describing associated objects and represents that three relationships may exist. For example, A and/or B may represent the following three cases: only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that words such as "example" or "for example" indicate giving an example, an illustration, or a description. Any embodiment described by using "example" or "for example" shall not be construed as being more preferred or having more advantages than another embodiment. Use of the word "example" or "for example" is intended to present a related concept.

To facilitate understanding of the embodiments, the following first briefly describes the terms.

1. Multi-Link (ML)

During the development and evolution of a cellular network and a wireless local area network (WLAN), improving throughput is a continuous objective. Protocols for WLAN systems are discussed in the Institute of Electrical and Electronics Engineers (IEEE) 802.11 standard group. For example, throughput is continuously improved in standards such as IEEE 802.11a, IEEE 802.11b, IEEE 802.11g, IEEE 802.11n, IEEE 802.11ac, and IEEE 802.11ax. The next-generation standard IEEE 802.11be has an objective of extremely high throughput (EHT) and uses the ML technology as one of key technologies.

The ML technology enables data to be sent and received on a plurality of links, so that the data can be transmitted on a larger bandwidth. This significantly improves throughput. A multi-link may be deployed on a multi-band, and there may be one or more links on one frequency band. The multi-band may include, but is not limited to, the following frequency bands: the 2.4 GHz wireless fidelity (Wi-Fi) frequency band, the 5 GHz Wi-Fi frequency band, and the 6 GHz Wi-Fi frequency band.

2. Uplink Direction and Downlink Direction

An uplink direction is a transmission direction in which a STA sends data to an AP.

A downlink direction is a transmission direction in which an AP sends data to a STA.

3. Uplink Receive Power and Downlink Receive Power of a Link

Uplink receive power of a link can be understood as receive power of an AP that operates on the link.

Downlink receive power of a link may be understood as receive power of a STA that operates on the link.

The embodiments may be applicable to a WLAN scenario, and support an IEEE 802.11 system standard, for example, the next-generation 802.11be standard or a further next-generation standard of the IEEE 802.11ax standard. Application scenarios may include communication between an access point (AP) and a station (STA), communication between APs, and communication between STAs, and the like. The following uses a communication scenario between a STA and an AP as an example for description.

A STA may be a user terminal, a user apparatus, an access apparatus, a subscriber station, a subscriber unit, a mobile station, a user agent, a user device, or another device that has a wireless communication function. The user terminal may be a handheld device, a vehicle-mounted device, a wearable device, or a computing device that has a wireless communication function, or another processing device connected to a wireless modem. The user terminal may also be user equipment (UE), a mobile station (MS), a terminal, a terminal device, a portable communication device, a handheld device, a portable computing device, an entertainment device, a game device or system, a global positioning system device, or any other appropriate device in various forms configured to perform network communication via wireless media. Herein, for ease of description, the devices mentioned above are collectively referred to as a station or STA.

An access point (AP) may be an apparatus that is deployed in a wireless communication network and that provides a wireless communication function for a STA associated with the access point AP. The access point AP may be used as a hub of the communication system and may be a communication device such as a base station, a router, a gateway, a repeater, a communication server, a switch, or a bridge. The base station may be a macro base station, a micro base station, a relay station, and the like in various forms. Herein, for ease of description, the devices mentioned above are collectively referred to as an access point AP.

FIG. 1 shows a communication system according to an embodiment. The communication system includes a multi-link AP and a multi-link STA. The multi-link AP includes N APs, for example, an AP #1 to an AP #N. The N APs one-to-one correspond to N links supported by the multi-link AP. The multi-link STA may include M STAs, for example, a STA #1 to a STA #M. The M STAs one-to-one correspond to M links supported by the multi-link STA. M and N are integers greater than 1. M may be equal to N, or may not be equal to N.

A STA that is of the multi-link STA and that operates on a link may be associated with an AP that is of the multi-link AP and that operates on the same link, so that the STA and the AP may perform data transmission on the link. For example, the STA #1 of the multi-link STA is associated with the AP #1 of the multi-link AP, so that the STA #1 and the AP #1 communicate with each other on a link 1. The STA #2 of the multi-link STA is associated with the AP #2 of the multi-link AP, so that the STA #2 and the AP #2 communicate with each other on a link 2. The rest may be deduced by analogy, and details are not described again.

In the embodiments, an AP/a STA corresponding to a link may be described as an AP/a STA operating on the link.

The following describes in detail the embodiments with reference to the communication system shown in FIG. 1.

Figure 2:
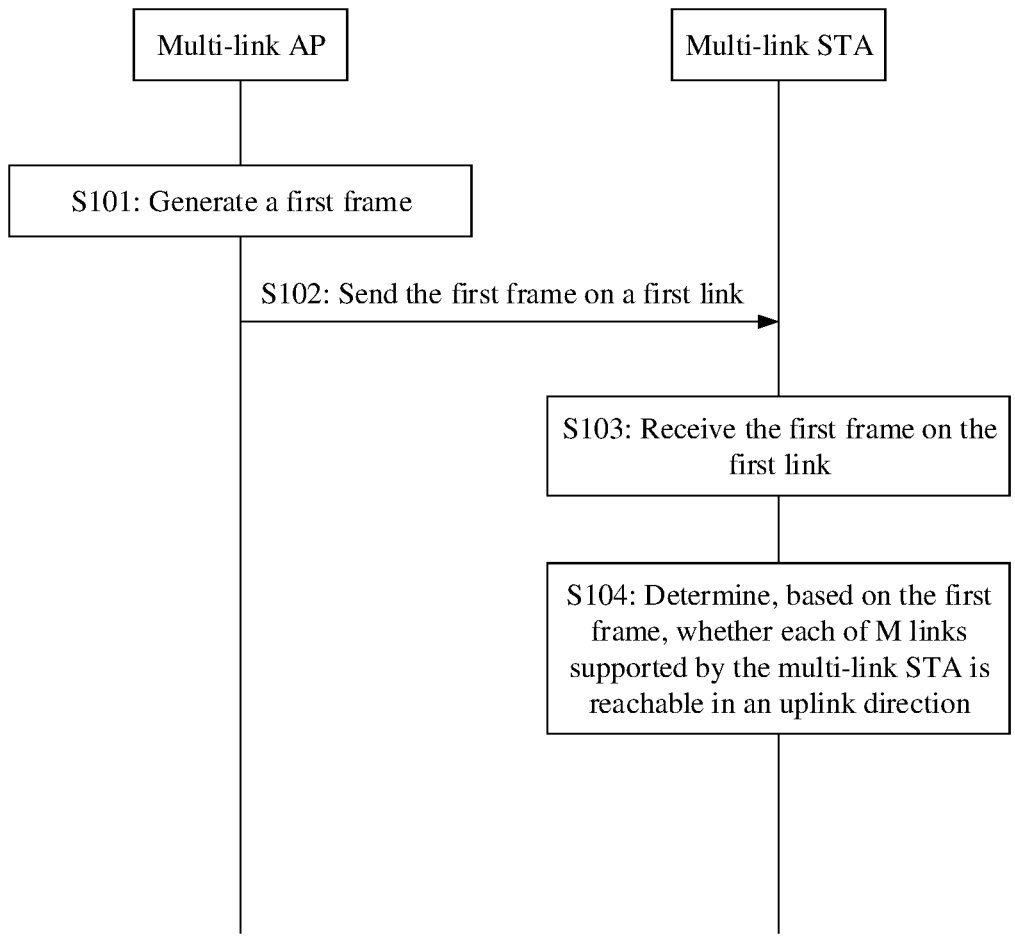
FIG. 2 is a flowchart of a link reachability determining method according to an embodiment.

FIG. 2 shows a link reachability determining method according to an embodiment. The method includes the following steps.

S101: A multi-link AP generates a first frame.

A first link is one of N links supported by the multi-link AP.

Optionally, the first frame is a beacon frame or a probe response frame.

The first frame includes transmit power and antenna gain information of each AP of the multi-link AP. Transmit power and antenna gain information of an AP are for evaluating reachability of a link on which the AP operates.

Optionally, that the first frame includes transmit power and antenna gain information of each AP of the multi-link AP may be implemented as follows: The first frame includes N pieces of link information, and the N pieces of link information one-to-one correspond to the N links supported by the multi-link AP. Link information of a link includes transmit power and antenna gain information of an AP corresponding to the link.

Optionally, a correspondence between link information and a link may be indicated in an explicit manner. For example, link information includes a link identifier. Therefore, the link information corresponds to a link indicated by the link identifier.

Optionally, a correspondence between link information and a link may be indicated in an implicit manner. For example, a link corresponding to link information is determined based on the location of the link information in the first frame.

It may be understood that the N pieces of link information may be carried in a newly defined information element in the first frame. Alternatively, the N pieces of link information may be carried in an existing information element in the first frame, for example, a multi-link information element (multi-link element).

When the N pieces of link information are located in a multi-link information element, the link information may further have another name, for example, per-link profile (per link profile). Optionally, the link information may further include another link-related parameter.

S102: The multi-link AP sends the first frame on the first link.

Optionally, the multi-link AP may send the first frame on a link other than the first link.

S103: A multi-link STA receives the first frame on the first link.

When the first link is also one of M links supported by the multi-link STA, the multi-link STA may receive the first frame on the first link in a passive scanning manner.

Because the multi-link STA receives the first frame on the first link, the multi-link STA may learn of downlink receive power used when a first STA receives the first frame. The first STA is a STA that is of the M STAs included in the multi-link STA and that operates on the first link.

S104: The multi-link STA determines, based on the first frame, whether each of the M links supported by the multi-link STA is reachable in an uplink direction.

In this embodiment, that the multi-link STA determines whether a link is reachable in the uplink direction may also be described as follows: The multi-link STA determines whether a link has uplink reachability.

The following uses a target link as an example to describe in detail how the multi-link STA determines reachability of a link in the uplink direction. It may be understood that, for another link of the M links, refer to an implementation of the target link.

The multi-link STA obtains a link loss of a target link and antenna gain information of a target AP based on the first frame. Then, the multi-link STA determines uplink receive power of the target link based on the antenna gain information of the target AP, the link loss of the target link, and transmit power and antenna gain information of a target STA. Finally, the multi-link STA determines, based on the uplink receive power of the target link, whether the target link is reachable in the uplink direction.

It may be understood that the determined uplink receive power of the target link is an estimated value.

The target link is one of the M links supported by the multi-link STA. The target AP is an AP that is of the N APs included in the multi-link AP and that operates on the target link. The target STA is a STA that is of the M STAs included in the multi-link STA and that operates on the target link The transmit power and the antenna gain information of the target STA are determined by the multi-link STA according to a situation (for example, a hardware configuration or a software configuration) of the multi-link STA.

In this embodiment, that the multi-link STA determines, based on the uplink receive power of the target link, whether the target link is reachable in the uplink direction includes: When the uplink receive power of the target link is greater than a first threshold corresponding to the target link, the multi-link STA determines that the target link is reachable in the uplink direction; when the uplink receive power of the target link is less than the first threshold corresponding to the target link, the multi-link STA determines that the target link is unreachable in the uplink direction; or when the uplink receive power of the target link is equal to the first threshold corresponding to the target link, the multi-link STA may determine, according to an actual situation or standards, that the target link is reachable or unreachable in the uplink direction.

The first threshold may be determined by the multi-link STA according to factors such as an actual situation of the multi-link STA and a network environment. Alternatively, the first threshold may be specified in a communication protocol. For the multi-link STA, first thresholds corresponding to different links may be the same or may be different.

Optionally, the uplink receive power of the target link may be determined according to formula (1):

$$AP_{RxP}(L)=STA_{TxP}(L)+STA_{Antenna\ gain}(L)-PL(L)+AP_{Antenna\ gain}(L) \quad (1)$$

$AP_{RxP}(L)$ represents the uplink receive power of the target link, $STA_{TxP}(L)$ represents the transmit power of the target STA, $STA_{Antenna\ gain}(L)$ represents the antenna gain information of the target STA, PL (L) represents the link loss of the target link, and $AP_{Antenna\ gain}(L)$ represents the antenna gain information of the target AP.

In this embodiment, the link loss of the target link may be calculated in the following two cases.

1. When the target link is the first link, the multi-link STA obtains transmit power and antenna gain information of a first AP based on the first frame. Then, the multi-link STA determines a link loss of the first link based on downlink receive power and antenna gain information of the first STA and the transmit power and the antenna gain information of the first AP.

The first AP is an AP that is of the N APs included in the multi-link AP and that operates on the first link. The first STA is a STA that is of the M STAs included in the multi-link STA and that operates on the first link.

Optionally, the link loss of the first link may be determined according to the following formula (2):

$$PL(L1)=AP_{TxP}(L1)+AP_{Antenna\ gain}(L1)-STA_{RxP}(L1)+STA_{Antenna\ gain}(L1) \quad (2)$$

PL(L1) represents the link loss of the first link, $AP_{TxP}(L1)$ represents the transmit power of the first AP, $AP_{Antenna\ gain}(L1)$ represents the antenna gain information of the first AP, $STA_{RxP}(L1)$ represents the receive power of the first STA, and $STA_{Antenna\ gain}(L1)$ represents the antenna gain information of the first STA.

2. When the target link is a second link, the multi-link STA obtains transmit power and antenna gain information of a first AP based on the first frame. Then, the multi-link STA determines a link loss of the first link based on downlink receive power and antenna gain information of the first STA and the transmit power and the antenna gain information of the first AP. Finally, the multi-link STA determines a link loss of the second link based on the link loss of the first link and a preset correspondence.

The second link is a link of the M links supported by the multi-link STA other than the first link.

Optionally, the link loss of the second link may be determined according to the following formula (3):

$$PL(L2)=f(PL(L1)) \quad (3)$$

PL(L2) represents the link loss of the second link. f( ) represents the preset correspondence.

It may be understood that the preset correspondence may be implemented by using a table, a function, or the like. The preset correspondence may be determined through big data analysis, by using a link loss model, or in another manner. This is not limited in this embodiment.

As shown in FIG. 2, the multi-link AP sends the first frame on the first link, and the first frame includes the antenna gain information and the transmit power of each AP of the multi-link AP. In this case, after receiving the first frame on the first link, the multi-link STA can obtain, based on the first frame, a related parameter on an AP side for analyzing uplink reachability of a link. In this way, the multi-link STA can determine whether the link is reachable in the uplink direction. In addition, the multi-link STA can determine, based on the first frame transmitted on the first link, uplink reachability of each link supported by the multi-link STA. Therefore, in an AP discovery process, the multi-link STA needs to scan only the first link instead of all links. This helps reduce power consumption of the multi-link STA.

Figure 3:
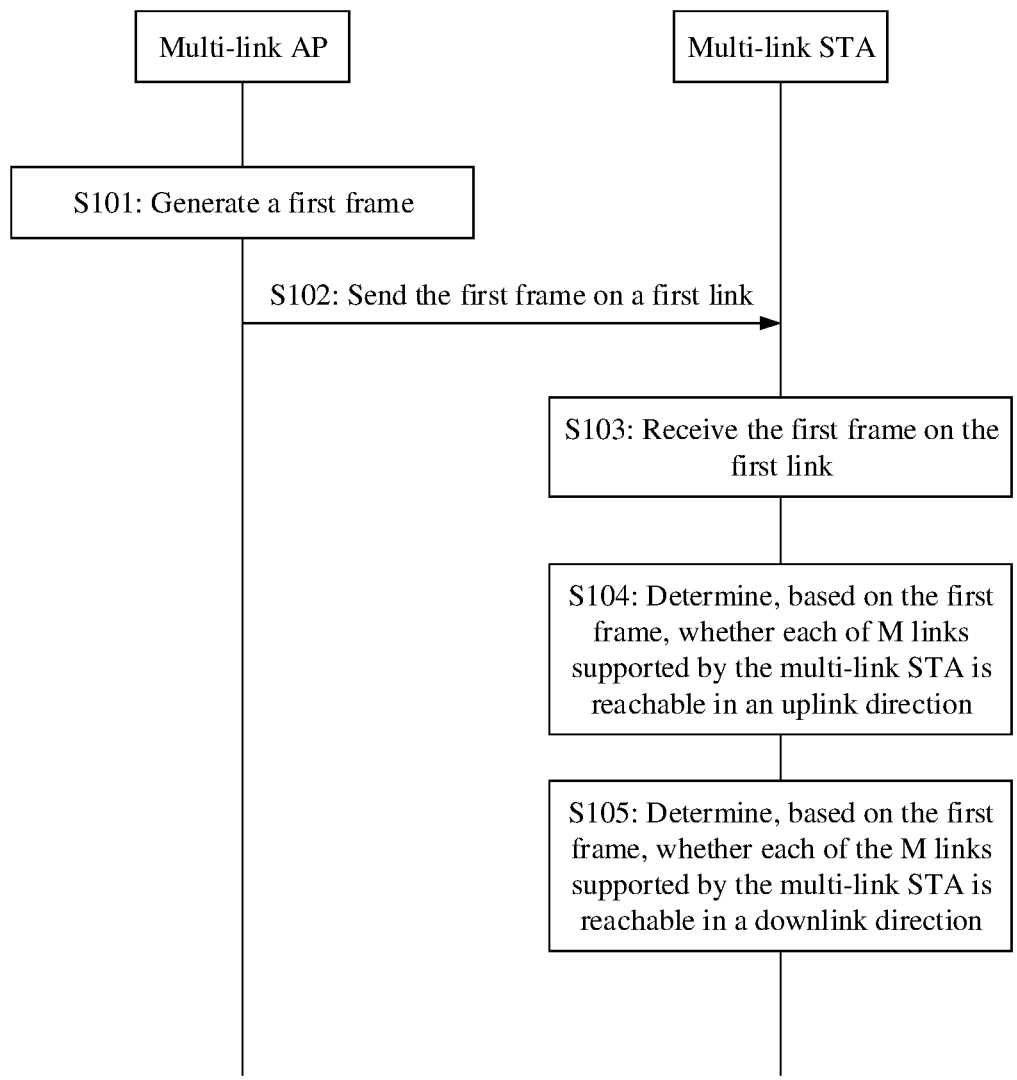
FIG. 3 is a flowchart of another link reachability determining method according to an embodiment.

Optionally, based on the method shown in FIG. 2, as shown in FIG. 3, the link reachability determining method may further include the following step S105.

S105: The multi-link STA determines, based on the first frame, whether each of the M links supported by the multi-link STA is reachable in a downlink direction.

In this embodiment, that the multi-link STA determines whether a link is reachable in the downlink direction may also be described as follows: The multi-link STA determines whether a link has downlink reachability.

The following uses a target link as an example to describe in detail how the multi-link STA determines whether a link is reachable in the downlink direction. It may be understood that, for an implementation of another link, refer to the target link.

The multi-link STA obtains a link loss of the target link, antenna gain information of a target AP, and transmit power of the target AP based on the first frame. Then, the multi-link STA determines downlink receive power of the target link based on the link loss of the target link, the antenna gain information of the target AP, the transmit power of the target AP, and antenna gain information of a target STA. Finally, the multi-link STA determines, based on the downlink receive power of the target link, whether the target link is reachable in the downlink direction.

It may be understood that the determined downlink receive power of the target link is an estimated value.

The target link is one of the M links supported by the multi-link STA. The target AP is an AP that is of the N APs included in the multi-link AP and that operates on the target link. The target STA is a STA that is of the M STAs included in the multi-link STA and that operates on the target link.

In this embodiment, that the multi-link STA determines, based on the downlink receive power of the target link, whether the target link is reachable in the downlink direction includes: When the downlink receive power of the target link is greater than a second threshold corresponding to the target link, the multi-link STA determines that the target link is reachable in the downlink direction; when the downlink receive power of the target link is less than the second threshold corresponding to the target link, the multi-link STA determines that the target link is unreachable in the downlink direction; or when the downlink receive power of the target link is equal to the second threshold corresponding to the target link, the multi-link STA may determine, according to an actual situation or standards, that the target link is reachable or unreachable in the downlink direction.

The second threshold may be determined by the multi-link STA according to factors such as an actual situation of the multi-link STA and a network environment. Alternatively, the second threshold may be specified in a communication protocol. For the multi-link STA, second thresholds corresponding to different links may be the same or may be different.

Optionally, the downlink receive power of the target link may be determined according to formula (4):

$$STA_{RxP}(L) = AP_{TxP}(L) + AP_{Antenna\ gain}(L) - PL(L) + STA_{Antenna\ gain}(L) \qquad (4)$$

$STA_{RxP}(L)$ represents the downlink receive power of the target link, $AP_{TxP}(L)$ represents the transmit power of the target AP, $AP_{Antenna\ gain}(L)$ represents the antenna gain information of the target AP, $PL(L)$ represents the link loss of the target link, and $STA_{Antenna\ gain}(L)$ represents the antenna gain information of the target STA.

For a manner of calculating the link loss of the target link, refer to related descriptions in step S104. Details are not described herein again.

An execution sequence of step S104 and step S105 is not limited in this embodiment. For example, step S104 may be performed before step S105, step S104 is performed after step S105, or step S104 and step S105 are simultaneously performed.

As shown in FIG. 3, the multi-link AP sends the first frame on the first link, and the first frame includes the antenna gain information and the transmit power of each AP of the multi-link AP. In this case, after receiving the first frame on the first link, the multi-link STA can obtain, based on the first frame, a related parameter on an AP side for analyzing downlink reachability of a link. In this way, the multi-link STA can determine whether the link is reachable in the downlink direction. In addition, the multi-link STA may determine, based on the first frame transmitted on the first link, downlink reachability of each link supported by the multi-link STA. Therefore, in an AP discovery process, the multi-link STA needs to scan only the first link instead of all links. This helps reduce power consumption of the multi-link STA.

After receiving the first frame sent by the multi-link AP, for each of the M links, the multi-link STA may determine whether the link has uplink reachability and whether the link has downlink reachability. Further, the multi-link STA may determine a reachable link from the M links. The multi-link STA may determine, based on a quantity of reachable links of the M links, a reachability status of the multi-link AP that sends the first frame. It may be understood that the reachability status of the multi-link AP reflects a quantity of reachable links that can be established between the multi-link AP and the multi-link STA.

In the embodiments, a reachable link may be a link that has uplink reachability and/or downlink reachability.

In a passive scanning process, the multi-link STA may receive first frames sent by a plurality of multi-link APs on the first link. The multi-link STA may determine, based on a first frame sent by each multi-link AP, a reachability status of the multi-link AP. Further, the multi-link STA may determine an optimal multi-link AP based on a reachability status of each multi-link AP, another factor (for example, bandwidth supported by the multi-link AP), and the like. The multi-link STA may initiate an association process to the optimal multi-link AP to obtain a good network service.

For example, the multi-link STA receives first frames sent by a multi-link AP #1, a multi-link AP #2, and a multi-link AP #3. The multi-link STA determines, based on a first frame sent by the multi-link AP #1, that a quantity of reachable links that can be established between the multi-link STA and the multi-link AP #1 is 3. The multi-link STA determines, based on a first frame sent by the multi-link AP #2, that a quantity of reachable links that can be established between the multi-link STA and the multi-link AP #2 is 4. The multi-link STA determines, based on a first frame sent by the multi-link AP #3, that a quantity of reachable links that can be established between the multi-link STA and the multi-link AP #3 is 5. In this case, the multi-link STA may select the multi-link AP #3 to initiate an association process.

Figure 9:
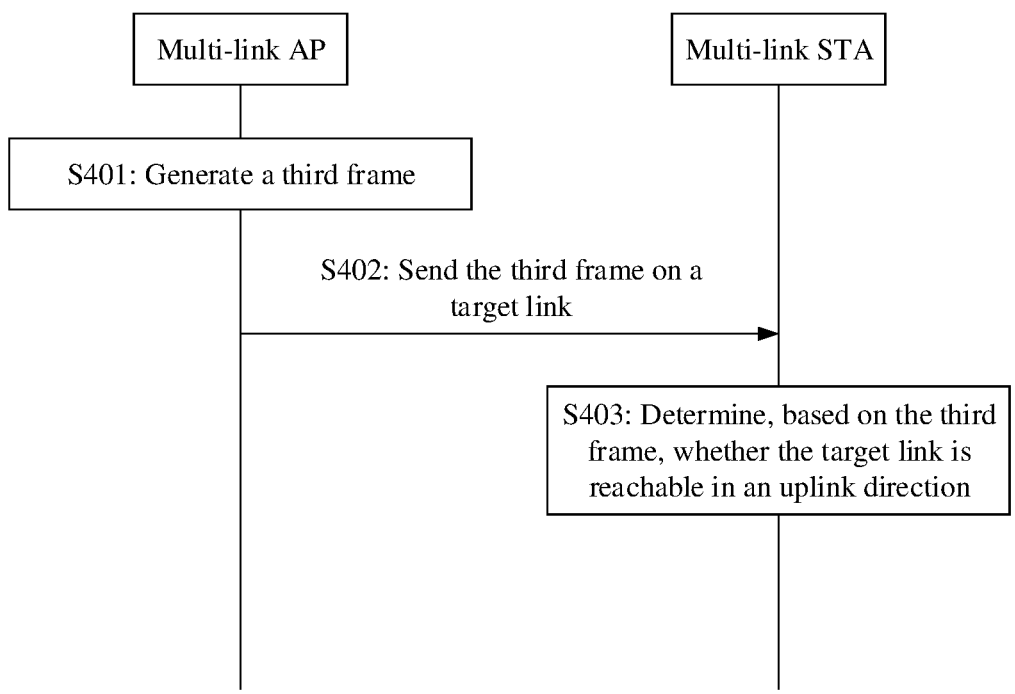
FIG. 9 is a flowchart of a link reachability determining method according to an embodiment.

FIG. 9 shows a link reachability determining method according to an embodiment. The method includes the following steps.

S401: A multi-link AP generates a third frame.

Optionally, the third frame is a beacon frame or a probe response frame.

The third frame includes transmit power of a target AP. The target AP is an AP that is of the multi-link AP and that operates on a target link. The target link is any one of a plurality of links supported by the multi-link AP. The transmit power of the target AP is for evaluating reachability of the target link in an uplink direction.

S402: The multi-link AP sends the third frame to a multi-link STA on the target link, so that the multi-link STA receives, on the target link, the third frame sent by the multi-link AP.

The target link is any one of a plurality of links supported by the multi-link STA.

In this embodiment, the multi-link STA receives the third frame. Therefore, the multi-link STA may determine receive power of a target STA. The target STA is a STA that is of the multi-link STA and that operates on the target link.

S403: The multi-link STA may determine, based on the third frame, whether the target link is reachable in the uplink direction.

In a possible implementation, the multi-link STA determines the transmit power of the target AP based on the third frame. Then, the multi-link STA determines uplink receive power of the target link based on the transmit power of the target AP, the receive power of the target STA, and transmit power of the target STA. The multi-link STA determines, based on the uplink receive power of the target link, whether the target link is reachable in the uplink direction.

The transmit power of the target STA is determined by the multi-link STA according to a situation (for example, a hardware configuration or a software configuration) of the multi-link STA.

It may be understood that the uplink receive power of the target link is an estimated value.

The uplink receive power of the target link may be receive power at which the target AP receives a radio frame sent by the target STA.

Optionally, the uplink receive power of the target link may be determined according to formula (6):

$$AP_{RxP}(L) = STA_{TxP}(L) - AP_{TxP}(L) + STA_{RxP}(L) \quad (6)$$

$AP_{RxP}(L)$ represents uplink receive power of a link, $STA_{TxP}(L)$ represents transmit power of a STA, $AP_{TxP}(L)$ represents transmit power of an AP, and $STA_{RxP}(L)$ represents receive power of the STA.

Optionally, formula (6) may be deduced by using the following formula (7) and formula (8).

$$PL(L) - AP_{Antenna\ gain}(L) - STA_{Antenna\ gain}(L) = AP_{TxP}(L) - STA_{RxP}(L) \quad (7)$$

$$AP_{RxP}(L) = STA_{TxP}(L) - (PL(L) - AP_{Antenna\ gain}(L) - STA_{Antenna\ gain}(L)) \quad (8)$$

$PL(L)$ represents a link loss of the target link, $AP_{Antenna\ gain}(L)$ Represents an antenna gain of the target AP, and $STA_{Antenna\ gain}(L)$ represents an antenna gain of the target STA.

In this embodiment, that the multi-link STA determines, based on the uplink receive power of the target link, whether the target link is reachable in the uplink direction includes: When the uplink receive power of the target link is greater than a first threshold corresponding to the target link, the multi-link STA determines that the target link is reachable in the uplink direction; when the uplink receive power of the target link is less than the first threshold corresponding to the target link, the multi-link STA determines that the target link is unreachable in the uplink direction; or when the uplink receive power of the target link is equal to the first threshold corresponding to the target link, the multi-link STA may determine, according to an actual situation or standards, that the target link is reachable or unreachable in the uplink direction.

As shown in FIG. 9, the multi-link AP sends the third frame to the multi-link STA. The third frame includes the transmit power of the target AP. Therefore, the multi-link STA may determine, based on the third frame, whether the target link is reachable in the uplink direction. This can avoid selecting a link unreachable in an uplink direction for communication between the multi-link STA and the multi-link AP.

In FIG. 9, only the target link is used as an example. For another link supported by the multi-link STA and the multi-link AP, the link may be reachable in an uplink direction.

Figure 4:
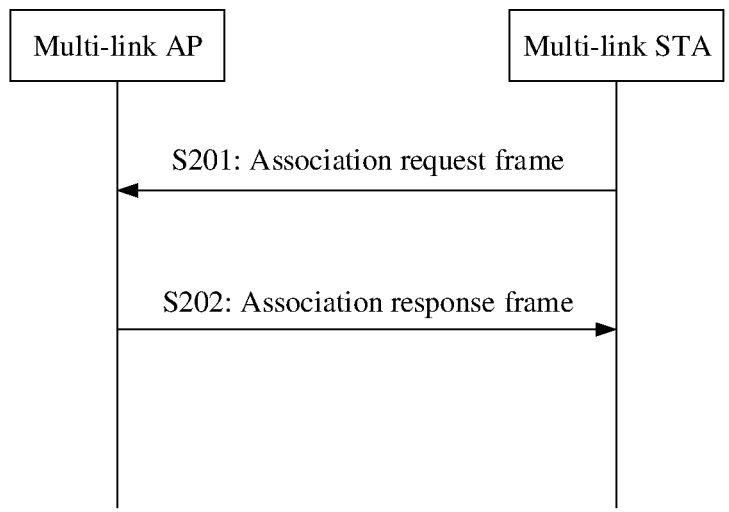
FIG. 4 is a schematic diagram of an association process according to an embodiment.

Based on the solution shown in FIG. 2, FIG. 3, or FIG. 9, the following briefly describes an association process between a multi-link STA and a multi-link AP by using an embodiment shown in FIG. 4.

As shown in FIG. 4, the association process includes the following steps.

S201: A multi-link STA sends an association request frame to a multi-link AP, so that the multi-link AP receives the association request frame sent by the multi-link STA.

In this embodiment, the multi-link STA may determine whether a target link is a reachable link based on the solution shown in FIG. 2, FIG. 3, or FIG. 9.

Optionally, if the target link is a reachable link, a target STA of the multi-link STA may establish an association with a target AP of the multi-link AP, so that the target STA can communicate with the target AP on the target link. Based on this, the association request frame may be for requesting to establish an association between the target STA and the target AP.

Optionally, when the target link is an unreachable link, the multi-link STA may use either of the following two implementations.

Implementation 1: The target STA of the multi-link STA does not establish an association with the target AP of the multi-link AP. In this case, the target STA and the target AP cannot perform data transmission on the target link. This avoids impact on normal communication caused during failure in data transmission on the target link.

Implementation 2: The target STA of the multi-link STA establishes an association with the target AP of the multi-link AP, but the target link is disabled. In this way, when the target link is unreachable, disabling the target link can reduce power consumption of the multi-link STA. In addition, the target link may change from an unreachable link to a reachable link due to movement of the multi-link STA. After the target link changes to a reachable link, the multi-link STA may indicate the multi-link AP to enable the target link, to perform data transmission on the target link.

Based on the implementation 2, if the target link is an unreachable link, the association request frame may be for requesting to establish an association between the target AP and the target STA, and the association request frame may further indicate to disable (disable) the target link.

Optionally, that the association request frame may further indicate to disable the target link may be implemented in an explicit manner. For example, the association request frame includes status information of the target link. The status information of the target link includes an identifier of the target link, the status information of the target link further includes status information, and the status information may be implemented with one or more bits. For example, the status information is implemented with one bit. When a value of the bit is 0, it indicates to disable the target link.

Optionally, that the association request frame may further indicate to disable the target link may be implemented in an implicit manner. For example, the association request frame includes mapping information, and the mapping information indicates a traffic identifier (TID)-to-link mapping relationship. When the mapping relationship indicated by the mapping information does not include a mapping relationship between the target link and any TID, the association request frame indicates to disable the target link.

It may be understood that, for another link of the M links supported by the multi-link STA, refer to an implementation of the target link. Details are not described herein.

S202: The multi-link AP sends an association response frame to the multi-link STA, so that the multi-link STA receives the association response frame sent by the multi-link AP.

As shown in FIG. 4, when the target link is a reachable link, the multi-link STA may request to establish an association between the target STA and the target AP in an association process, to fully use the target link for data transmission. When the target link is unreachable, the multi-link STA does not request to establish an association between the target STA and the target AP in an association process. Alternatively, the multi-link STA requests to establish an association between the target STA and the target AP in an association process but disables the target link. This avoids impact on data transmission caused when the target link is an unreachable link, and reduces power consumption of the multi-link STA.

Figure 5:
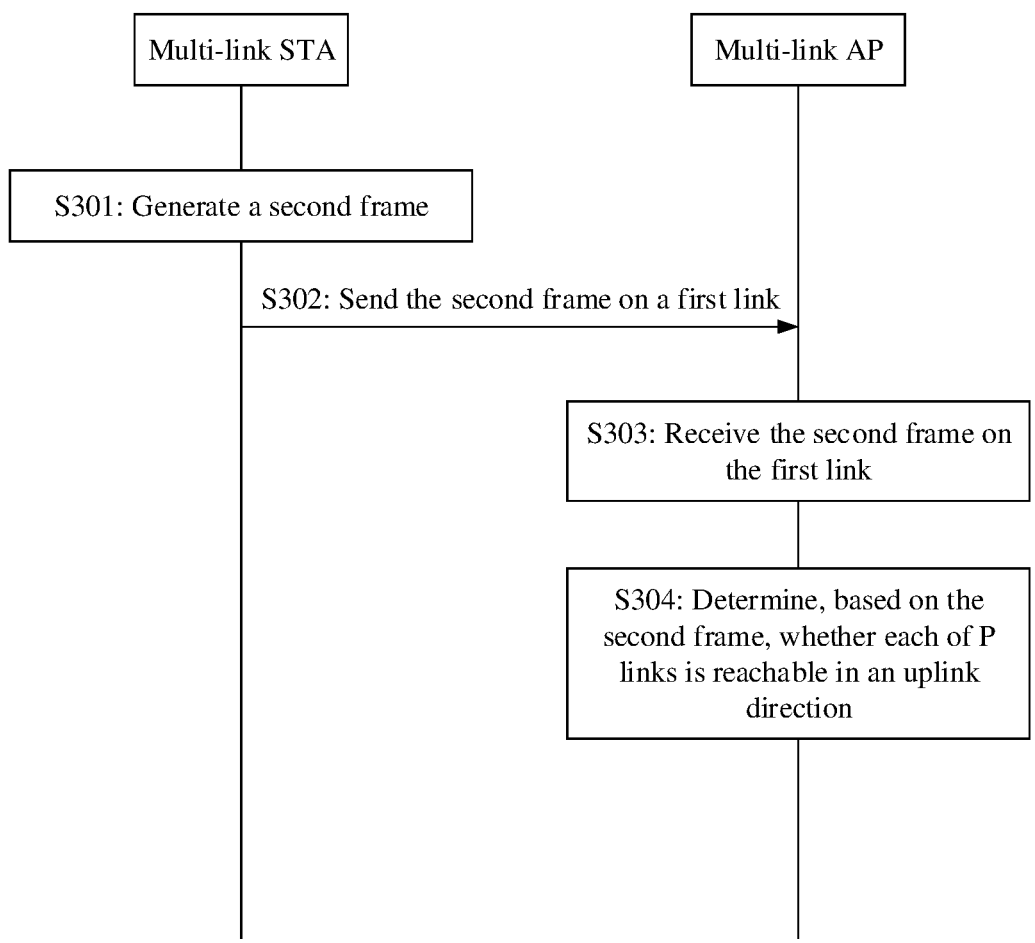
FIG. 5 is a flowchart of still another link reachability determining method according to an embodiment.

FIG. 5 shows a link reachability determining method according to an embodiment. The method includes the following steps.

S301: A multi-link STA generates a second frame.

The second frame includes first information of each of P STAs, and first information is for determining a sum of transmit power and antenna gain information of a STA. The P STAs are a subset of M STAs included in the multi-link STA, and P is a positive integer less than or equal to M.

Embodiment 1: First information includes a sum of transmit power and antenna gain information of a STA.

Embodiment 2: First information includes transmit power and antenna gain information of a STA. In this case, a multi-link AP may calculate a sum of the transmit power and the antenna gain information of the STA based on the transmit power and the antenna gain information that are carried in the first information of the STA.

It may be understood that, compared with embodiment 2, embodiment 1 can reduce signaling overheads of the first information.

Optionally, a correspondence between first information and a STA may be indicated in an explicit manner. For example, first information includes a link identifier corresponding to a STA.

Optionally, a correspondence between first information and a STA may be indicated in an implicit manner. For example, a STA corresponding to first information is determined based on a location of the first information in the second frame.

Optionally, P links corresponding to the P STAs are reachable in a downlink direction. It may be understood that, before sending the second frame, the multi-link STA may determine, according to a solution in conventional technologies or a solution (for example, step S105 in the embodiment shown in FIG. 3), whether each of M links supported by the multi-link STA is reachable in a downlink direction.

Optionally, the second frame may be an association request frame. When the second frame is an association request frame, the second frame is for requesting to establish the P links between the multi-link AP and the multi-link STA, or the second frame is for requesting to establish an association relationship between P APs of the multi-link AP and the P STAs of the multi-link STA.

S302: The multi-link STA sends the second frame on a first link.

The first link is any one of the P links.

S303: The multi-link AP receives the second frame on the first link.

Because the multi-link AP receives the second frame on the first link, the multi-link AP may learn of uplink receive power used when a first AP receives the second frame. The first AP is an AP that is of N APs included in the multi-link AP and that operates on the first link.

S304: The multi-link AP determines, based on the second frame, whether each of the P links is reachable in an uplink direction.

The following uses a target link as an example to describe in detail how the multi-link AP determines whether a link is reachable in an uplink direction. It may be understood that, for another link of the P links, refer to an implementation of the target link.

The multi-link AP determines a link loss of the target link and first information of a target STA based on the second frame. Then the multi-link AP determines uplink receive power of the target link based on the link loss of the target link, the first information of the target STA, and antenna gain information of a target AP. Finally, the multi-link AP determines, based on the uplink receive power of the target link, whether the target link is reachable in the uplink direction.

It may be understood that the determined uplink receive power of the target link is an estimated value.

The target link is any one of the P links. The target AP is an AP that is of the N APs included in the multi-link AP and that operates on the target link. The target STA is a STA that is of the P STAs and that operates on the target link.

In this embodiment, that the multi-link AP determines, based on the uplink receive power of the target link, whether the target link is reachable in the uplink direction includes: When the uplink receive power of the target link is greater than a third threshold corresponding to the target link, the multi-link AP determines that the target link is reachable in the uplink direction; when the uplink receive power of the target link is less than a third threshold corresponding to the target link, the multi-link AP determines that the target link is unreachable in the uplink direction; or when the uplink receive power of the target link is equal to a third threshold corresponding to the target link, the multi-link AP may determine, according to an actual situation or standards, that the target link is reachable or unreachable in the uplink direction.

The third threshold may be determined by the multi-link AP according to factors such as an actual situation of the multi-link AP and a network environment. Alternatively, the third threshold may be specified in a communication protocol. For the multi-link AP, third thresholds corresponding to different links may be the same or may be different.

Optionally, for a formula for calculating the uplink receive power of the target link, refer to the foregoing formula (1). Details are not described herein again.

In this embodiment, the link loss of the target link may be calculated in the following two cases.

1. When the target link is the first link, the multi-link AP obtains first information of a first STA based on the second frame. Then, the multi-link AP determines a link loss of the first link based on the first information of the first STA, the uplink receive power of the first AP, and antenna gain information of the first AP.

Optionally, the link loss of the first link may be determined according to the following formula (5):

$$PL(L1)=(STA_{TxP}(L1)+STA_{Antenna\ gain}(L1)-AP_{RxP}(L1)+AP_{Antenna\ gain}(L1) \quad (5)$$

$(STA_{TxP}(L1)+STA_{Antenna\ gain}(L1))$ represents a sum of antenna gain information and transmit power of the first STA, $AP_{RxP}(L1)$ represents the uplink receive power of the first AP, and $AP_{Antenna\ gain}(L1)$ represents the antenna gain information of the first AP.

2. When the target link is a second link, the multi-link AP obtains first information of a first STA based on the second frame. Then, the multi-link AP determines a link loss of the first link based on the first information of the first STA, the uplink receive power of the first AP, and antenna gain information of the first AP. Finally, the multi-link AP determines a link loss of the second link based on the link loss of the first link and a preset correspondence.

The second link is a link of the M links supported by the multi-link STA other than the first link. For a formula for calculating the link loss of the second link, refer to the foregoing formula (3). Details are not described herein again.

As shown in FIG. 5, the second frame sent by the multi-link STA on the first link includes first information of each of the P STAs. Therefore, the multi-link AP may obtain, based on the second frame, a related parameter on a STA side for analyzing uplink reachability of any one of the P links. In this way, the multi-link AP may determine whether any one of the P links is reachable in the uplink direction.

Figure 6:
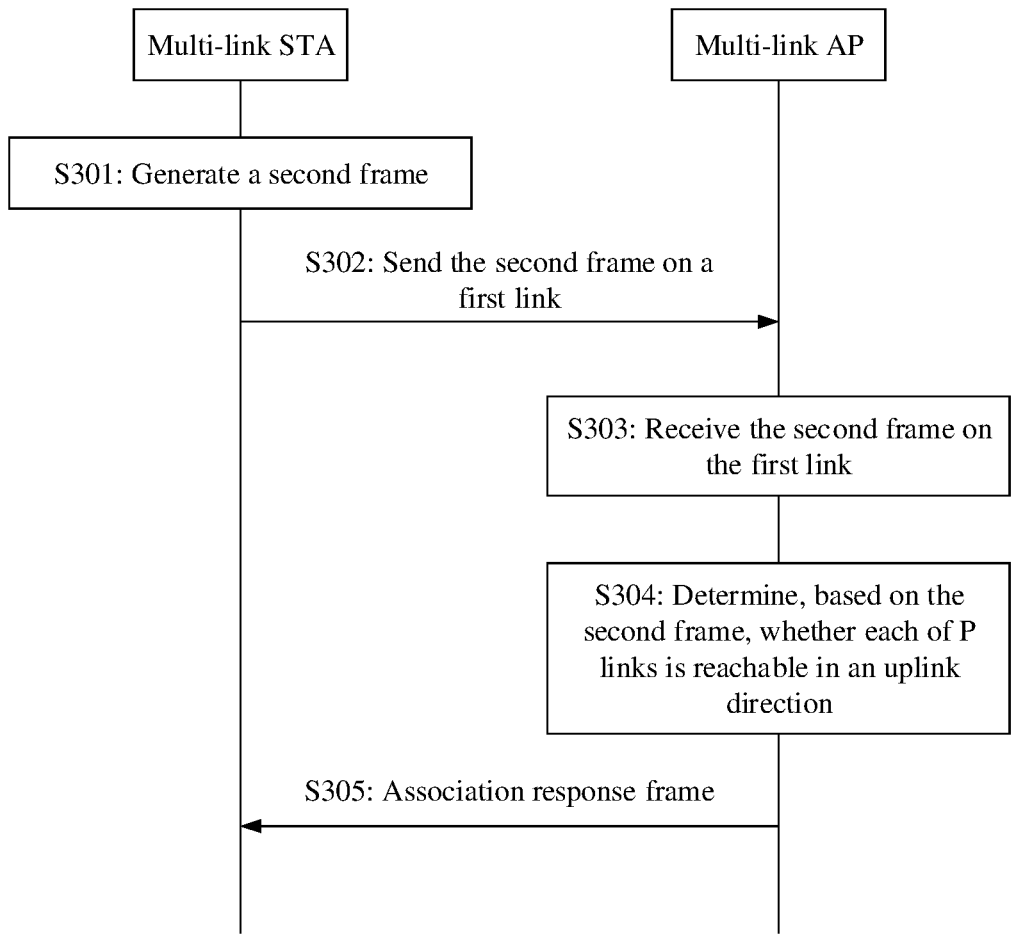
FIG. 6 is a flowchart of yet another link reachability determining method according to an embodiment.

Optionally, if the second frame is an association request frame, as shown in FIG. 5 and FIG. 6, the link reachability determining method may further include step S305.

S305: The multi-link AP sends an association response frame to the multi-link STA, so that the multi-link STA receives the association response frame sent by the multi-link AP.

Optionally, when the multi-link AP determines that the target link is reachable in the uplink direction, the multi-link AP may agree to establish an association between the target AP and the target STA. Based on this, the association response frame may be for agreeing to establish an association between the target AP and the target STA.

Optionally, when the multi-link AP determines that target link is unreachable in the uplink direction, the multi-link AP may use either of the following two implementations.

Implementation 1: The multi-link AP does not agree to establish an association between the target AP and the target STA.

Based on the implementation 1, the association response frame is for refusing to establish an association between the target AP and the target STA.

Implementation 2: The multi-link AP agrees to establish an association between the target AP and the target STA, but the multi-link AP indicates the multi-link STA to disable the target link.

Based on the implementation 2, the association response frame is for agreeing to establish an association between the target AP and the target STA, and the association response frame further indicates the multi-link STA to disable the target link.

Optionally, that the association response frame indicates to disable the target link may be implemented in an explicit manner. For example, the association response frame includes status information of the target link. The status information of the target link includes an identifier of the target link, the status information of the target link further includes status information, and the status information may be implemented with one or more bits. For example, the status information is implemented with one bit. When a value of the bit is 0, it indicates to disable the target link.

Optionally, that the association response frame indicates to disable the target link may be implemented in an implicit manner. For example, the association response frame includes mapping information, and the mapping information indicates a traffic identifier (TID)-to-link mapping relationship. When the mapping relationship indicated by the mapping information does not include a mapping relationship between the target link and any TID, the association response frame indicates to disable the target link.

As shown in FIG. 6, when the target link is reachable in the uplink direction, the multi-link AP sends the association response frame, to agree to establish an association between the target STA and the target AP, so that the multi-link AP and the multi-link STA may communicate with each other on the target link. When the target link is unreachable in the uplink direction, the multi-link AP sends an association response frame, to refuse to establish an association between the target STA and the target AP and avoid affecting normal communication because the target link is unreachable. Alternatively, the multi-link AP sends an association response frame, to agree to establish an association between the target STA and the target AP and disable the target link. This avoids impact on normal communication caused when the target link is unreachable, and reduce power consumption of the multi-link STA.

The foregoing describes the embodiments from a perspective of a communication apparatus. It may be understood that, to implement the foregoing functions, a communication apparatus includes corresponding hardware structures and/or software modules for performing the functions. Persons skilled in the art should be easily aware that units, algorithms, and steps in the examples described with reference to the embodiments can be implemented in a form of hardware or a combination of hardware and computer software. Whether a function is performed by hardware or hardware driven by computer software depends on a particular application. Persons skilled in the art may use different methods to implement the described functions, but it should not be considered that the implementation goes beyond the scope of the embodiments.

In the embodiments, the apparatus may be divided into functional modules based on the foregoing method examples. For example, each functional module may be obtained through division based on a corresponding function, or two or more functions may be integrated into one functional module. The integrated module may be implemented in a form of hardware or may be implemented in a form of a software functional module. In this embodiment, division into the modules is an example and is merely logical function division and may be other division in actual implementation. An example in which each functional module is obtained through division based on each corresponding function is used below for description.

Figure 7:
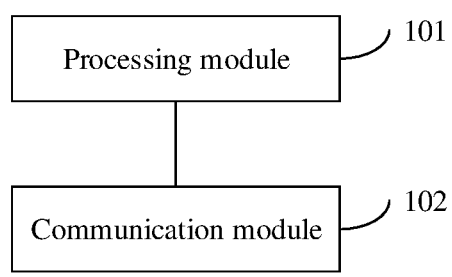
FIG. 7 is a schematic diagram depicting a structure of a communication apparatus according to an embodiment.

FIG. 7 shows a communication apparatus according to an embodiment. The communication apparatus includes a processing module 101 and a communication module 102.

When the communication apparatus serves as a multi-link AP, the processing module 101 is configured to perform step S104 in FIG. 2, step S105 in FIG. 3, step S301 in FIG. 5, and step S401 in FIG. 9. The communication module 102 is configured to perform step S103 in FIG. 2, steps S201 and S202 in FIG. 4, step S302 in FIG. 5, step S306 in FIG. 6, and step S402 in FIG. 9.

When the communication apparatus serves as a multi-link STA, the processing module 101 is configured to perform step S101 in FIG. 2, step S304 in FIG. 5, and step S403 in FIG. 9. The communication module 102 is configured to perform step S102 in FIG. 2, steps S201 and S202 in FIG. 4, step S303 in FIG. 5, step S305 in FIG. 6, and step S402 in FIG. 9.

Figure 8:
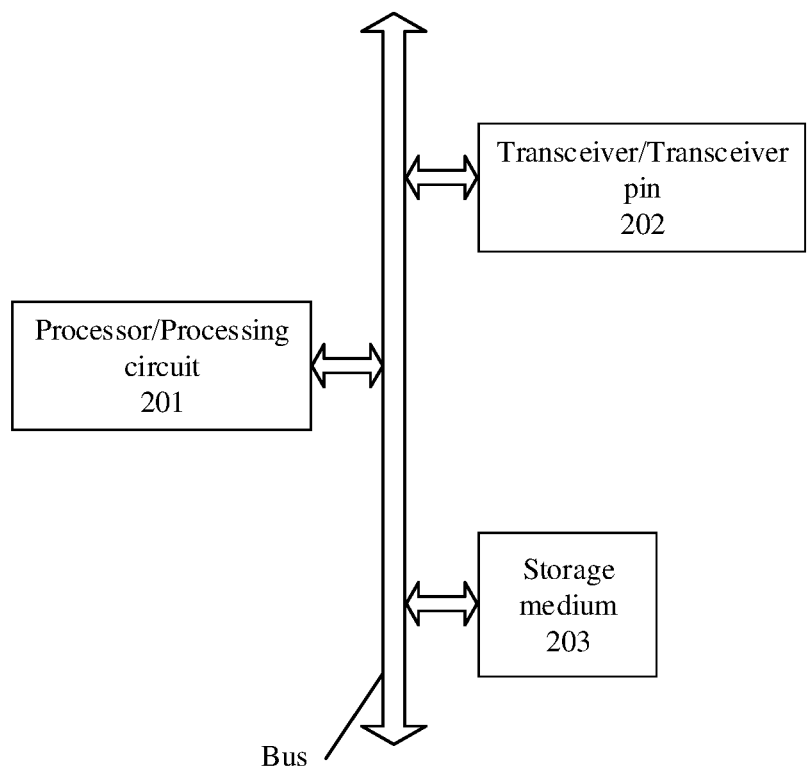
FIG. 8 is a schematic diagram depicting a structure of a communication apparatus according to an embodiment.

FIG. 8 is a diagram depicting a structure of a possible product form of a communication apparatus according to an embodiment.

In a possible product form, the communication apparatus in this embodiment may be a communication device, and the communication device includes a processor 201 and a transceiver 202. Optionally, the communication device further includes a storage medium 203.

When the communication apparatus serves as a multi-link AP, the processor 201 is configured to perform step S104 in FIG. 2, step S105 in FIG. 3, step S301 in FIG. 5, and step S401 in FIG. 9. The transceiver 202 is configured to perform step S103 in FIG. 2, steps S201 and S202 in FIG. 4, step S302 in FIG. 5, step S306 in FIG. 6, and step S402 in FIG. 9.

When the communication apparatus serves as a multi-link STA, the processor 201 is configured to perform step S101 in FIG. 2, step S304 in FIG. 5, and step S403 in FIG. 9. The transceiver 202 is configured to perform step S102 in FIG. 2, steps S201 and S202 in FIG. 4, step S303 in FIG. 5, step S305 in FIG. 6, and step S402 in FIG. 9.

In another possible product form, the communication apparatus in this embodiment may alternatively be implemented by a general-purpose processor or an application-specific processor that is commonly referred to as a chip. The chip includes a processing circuit 201 and a transceiver pin 202. Optionally, the chip may further include a storage medium 203.

In another possible product form, the communication apparatus in this embodiment may alternatively be implemented by using the following circuit or component: one or more field programmable gate arrays (FPGA), programmable logic devices (PLD), controllers, state machines, logic gates, discrete hardware components, any other appropriate circuits, or any combination of circuits that can perform the various functions.

It should be understood that computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

Based on the foregoing descriptions of the implementations, persons skilled in the art may clearly understand that for the purpose of convenient and brief descriptions, division into the foregoing functional modules is merely used as an example for descriptions. During actual application, the foregoing functions can be allocated to different functional modules for implementation based on a requirement, in other words, an inner structure of an apparatus is divided into different functional modules to implement all or a part of the functions described above.

It should be understood that, in the several embodiments, the apparatuses and methods may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, in other words, may be located in one place, or may be distributed on different places. A part or all of the units may be selected based on an actual requirement to achieve an objective of the solutions of embodiments.

In addition, functional units in the embodiments may be integrated into one processing unit, or each of the units may exist alone physically, or two or more units may be integrated into one unit. The integrated unit may be implemented in a form of hardware or may be implemented in a form of a software functional unit.

When the integrated unit is implemented in a form of a software functional unit and sold or used as an independent product, the integrated unit may be stored in a readable storage medium. Based on such an understanding, the embodiments may be implemented in the form of a software product. The software product is stored in a non-transitory storage medium and includes several instructions for indicating a device (which may be a single-chip microcomputer, a chip, or the like) or a processor to perform all or a part of the steps of the methods described in the embodiments.

The foregoing descriptions are only implementations, but are not intended as limiting. Any variation or replacement shall fall within the scope of the embodiments.

What is claimed is:

1. A link reachability determining method, wherein the method is applied to a multi-link station (STA), the multi-link STA comprises M STAs, the M STAs one-to-one correspond to M links supported by the multi-link STA, M is an integer greater than 1, and the method comprises:

receiving a first frame sent by a multi-link access point AP on a first link, wherein the first link is one of the M links supported by the multi-link STA, the multi-link AP comprises N APs, the first frame comprises transmit power and antenna gain information of each of the N APs, and N is an integer greater than 1; and determining, based on the first frame, whether each of the M links supported by the multi-link STA is reachable in an uplink direction, the determining comprising at least:

determining a link loss of a target link and antenna gain information of a target AP based on the first frame, wherein the target link is one of a plurality of links supported by the multi-link STA, and the target AP is an AP that is of the multi-link AP and that operates on the target link; and determining uplink receive power of the target link based on the antenna gain information of the target AP, the link loss of the target link, and transmit power and antenna gain information of a target STA, wherein the target STA is a STA that is of the multi-link STA and that operates on the target link.

2. The link reachability determining method according to claim 1, wherein determining, based on the first frame, whether each of the M links supported by the multi-link STA is reachable in the uplink direction further comprises:

determining, based on the uplink receive power of the target link, whether the target link is reachable in the uplink direction.

3. The link reachability determining method according to claim 2, wherein, when the target link is the first link, determining the link loss of the target link based on the first frame further comprises:

obtaining transmit power and antenna gain information of a first AP based on the first frame, wherein the first AP is an AP that is of the multi-link AP and that operates on the first link; and determining a link loss of the first link based on downlink receive power and antenna gain information of a first STA and the transmit power and the antenna gain information of the first AP, wherein the first STA is a STA that is of the multi-link STA and that operates on the first link.

4. The link reachability determining method according to claim 2, wherein, when the target link is the second link, determining the link loss of the target link based on the first frame further comprises:

obtaining transmit power and antenna gain information of a first AP based on the first frame, wherein the first AP is an AP that is of the multi-link AP and that operates on the first link;

determining a link loss of the first link based on receive power and antenna gain information of a first STA and the transmit power and the antenna gain information of the first AP, wherein the first STA is a STA that is of the multi-link STA and that operates on the first link; and determining a link loss of the second link based on the link loss of the first link and a preset correspondence, wherein the second link is a link of the M links supported by the multi-link STA other than the first link.

5. The link reachability determining method according to claim 2, wherein determining, based on the uplink receive power of the target link, whether the target link is reachable in the uplink direction further comprises:

when the uplink receive power of the target link is greater than or equal to a first threshold corresponding to the target link, determining that the target link is reachable in the uplink direction; or when the uplink receive power of the target link is less than the first threshold corresponding to the target link, determining that the target link is unreachable in the uplink direction.

6. The link reachability determining method according to claim 2, wherein the first frame is a beacon frame or a probe response frame.

7. The link reachability determining method according to claim 2, wherein when the target link is the reachable link, the method further comprises:

sending an association request frame to the multi-link AP, wherein the association request frame is for requesting to establish an association between the target STA and the target AP.

8. The link reachability determining method according to claim 2, wherein when the target link is the unreachable link, the method further comprises:

sending an association request frame to the multi-link AP, wherein the association request frame is for requesting to establish an association between the target STA and the target AP, and the association request frame further indicates to disable the target link.

9. The link reachability determining method according to claim 1, the method further comprises:

receiving a second frame sent by a multi-link STA on a first link, where the first link is one of the N links supported by the multi-link AP, the multi-link STA includes M STAs, the second frame includes first information of each of P STAs, first information of a STA is for determining a sum of transmit power and an antenna gain of the STA, the P STAs are a subset of the M STAs, M is an integer greater than 1, and P is a positive integer less than or equal to M; and determining, based on the second frame, whether each of P links is reachable in an uplink direction, where the P links one to-one correspond to the P STAs.

10. A communication apparatus, applied for a multi-link station (STA), wherein the multi-link STA comprises M STAs, the M STAs one-to-one correspond to M links supported by the multi-link STA, M is an integer greater than 1, the communication apparatus comprising:

at least one processor, and a memory storing instructions for execution by the at least one processor;

wherein, when executed, the instructions cause the communication apparatus to perform operations comprising:

receiving a first frame sent by a multi-link access point AP on a first link, wherein the first link is one of the M links supported by the multi-link STA, the multi-link AP comprises N APs, the first frame comprises transmit power and antenna gain information of each of the N APs, and N is an integer greater than 1; and determining, based on the first frame, whether each of the M links supported by the multi-link STA is reachable in an uplink direction, the determining comprising at least:

determining a link loss of a target link and antenna gain information of a target AP based on the first frame, wherein the target link is one of a plurality of links supported by the multi-link STA, and the target AP is an AP that is of the multi-link AP and that operates on the target link; and determining uplink receive power of the target link based on the antenna gain information of the target AP, the link loss of the target link, and transmit power and antenna gain information of a target STA, wherein the target STA is a STA that is of the multi-link STA and that operates on the target link.

11. The communication apparatus according to claim 10, wherein determining, based on the first frame, whether each of the M links supported by the multi-link STA is reachable in the uplink direction further comprises:
determining, based on the uplink receive power of the target link, whether the target link is reachable in the uplink direction.

12. The communication apparatus according to claim 11, wherein, when the target link is the first link, determining the link loss of the target link based on the first frame further comprises:
obtaining transmit power and antenna gain information of a first AP based on the first frame, wherein the first AP is an AP that is of the multi-link AP and that operates on the first link; and
determining a link loss of the first link based on downlink receive power and antenna gain information of a first STA and the transmit power and the antenna gain information of the first AP, wherein the first STA is a STA that is of the multi-link STA and that operates on the first link.

13. The communication apparatus according to claim 11, wherein, when the target link is the second link, determining the link loss of the target link based on the first frame further comprises:
obtaining transmit power and antenna gain information of a first AP based on the first frame, wherein the first AP is an AP that is of the multi-link AP and that operates on the first link;
determining a link loss of the first link based on receive power and antenna gain information of a first STA and the transmit power and the antenna gain information of the first AP, wherein the first STA is a STA that is of the multi-link STA and that operates on the first link; and
determining a link loss of the second link based on the link loss of the first link and a preset correspondence, wherein the second link is a link of the M links supported by the multi-link STA other than the first link.

14. The communication apparatus according to claim 11, wherein determining, based on the uplink receive power of the target link, whether the target link is reachable in the uplink direction further comprises:
when the uplink receive power of the target link is greater than or equal to a first threshold corresponding to the target link, determining that the target link is reachable in the uplink direction; or
when the uplink receive power of the target link is less than the first threshold corresponding to the target link, determining that the target link is unreachable in the uplink direction.

15. The communication apparatus according to claim 11, wherein the first frame is a beacon frame or a probe response frame.

16. The communication apparatus according to claim 11, wherein, when the target link is the reachable link, the operations further comprise:
sending an association request frame to the multi-link AP, wherein the association request frame is for requesting to establish an association between the target STA and the target AP.

17. The communication apparatus according to claim 11, wherein, when the target link is the unreachable link, the operations further comprise:
sending an association request frame to the multi-link AP, wherein the association request frame is for requesting to establish an association between the target STA and the target AP, and the association request frame further indicates to disable the target link.

18. A communication apparatus, applied for a multi-link AP, the multi-link AP comprises N APs, the N APs one-to-one correspond to N links supported by the multi-link AP, N is an integer greater than 1, the communication apparatus comprising:
at least one processor, and a memory storing instructions for execution by the at least one processor;
wherein, when executed, the instructions cause the communication apparatus to perform operations comprising:
generating a first frame, wherein the first frame comprises transmit power and antenna gain information of each of the N APs;
sending the first frame on a first link, wherein the first link is one of the N links supported by the multi-link AP; and
receiving an association request frame sent by a multi-link station (STA), wherein the multi-link STA comprises M STAs, the M STAs one-to-one correspond to M links supported by the multi-link STA, and M is an integer greater than 1; the association request frame is for requesting to establish an association between a target STA and a target AP, and the association request frame further indicates to disable a target link; and the target STA is a STA that is of the multi-link STA and that operates on the target link, the target AP is an AP that is of the multi-link AP and that operates on the target link, and the target link is a reachable link of the M links supported by the multi-link STA.

19. The communication apparatus according to claim 18, wherein the first frame is a beacon frame or a probe response frame.

20. The communication apparatus according to claim 18, wherein the operations further comprise:
receiving a second frame sent by a multi-link STA on the first link, where the first link is one of the N links supported by the multi-link AP, the multi-link STA includes M STAs, the second frame includes first information of each of P STAs, first information of a STA is for determining a sum of transmit power and an antenna gain of the STA, the P STAs are a subset of the M STAs, M is an integer greater than 1, and P is a positive integer less than or equal to M; and
determining, based on the second frame, whether each of P links is reachable in an uplink direction, where the P links one to-one correspond to the P STAs.

* * * * *